United States Patent
Park

(10) Patent No.: US 9,952,793 B2
(45) Date of Patent: Apr. 24, 2018

(54) MEMORY SYSTEM FOR PROCESSING DATA EFFICIENTLY BY SEARCHING SEGMENTS OF DATA AND OPERATING METHOD THEREOF

(71) Applicant: SK hynix Inc., Gyeonggi-do (KR)

(72) Inventor: Jeen Park, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 14/962,069

(22) Filed: Dec. 8, 2015

(65) Prior Publication Data

US 2017/0024157 A1    Jan. 26, 2017

(30) Foreign Application Priority Data

Jul. 21, 2015  (KR) .......................... 10-2015-0102948

(51) Int. Cl.
G06F 3/06 (2006.01)

(52) U.S. Cl.
CPC .......... G06F 3/0629 (2013.01); G06F 3/0604 (2013.01); G06F 3/0655 (2013.01); G06F 3/0673 (2013.01)

(58) Field of Classification Search
CPC .... G06F 3/0629; G06F 3/0673; G06F 3/0655; G06F 3/0604; G06F 13/1615; G06F 3/061; G11C 7/1039; G11C 29/76
USPC ......................................... 711/169, 202, 154
See application file for complete search history.

(56) References Cited

U.S. PATENT DOCUMENTS

| | | | | |
|---|---|---|---|---|
| 2002/0095555 A1* | 7/2002 | Berg | ................ | G06F 9/30098 711/149 |
| 2005/0132127 A1* | 6/2005 | Chung | ................ | G06F 12/0246 711/103 |
| 2007/0011382 A1* | 1/2007 | Roever | ............... | G06F 13/1663 710/240 |
| 2010/0220103 A1* | 9/2010 | Radke | ...................... | G09G 5/39 345/506 |
| 2012/0039138 A1* | 2/2012 | Ware | ................ | G11C 7/1039 365/193 |
| 2012/0089805 A1* | 4/2012 | Liu | ........................ | G06F 3/0643 711/173 |
| 2013/0097365 A1* | 4/2013 | Lee | ..................... | G06F 12/0246 711/103 |

(Continued)

FOREIGN PATENT DOCUMENTS

| | | |
|---|---|---|
| KR | 101173775 | 8/2012 |
| KR | 101453313 | 10/2014 |
| KR | 101465099 | 11/2014 |

*Primary Examiner* — Hong Kim
(74) *Attorney, Agent, or Firm* — IP & T Group LLP

(57) ABSTRACT

A memory system may include: a memory device including a plurality of pages having a plurality of memory cells coupled to a plurality of word lines and suitable for storing read data and write data requested from a host, a plurality of memory blocks each including the pages, a plurality of planes each including the memory blocks, and a plurality of memory chips each including the planes; and a controller suitable for searching map data of the read data corresponding to a read command received from the host on a basis of a plurality of segments, triggering memory chips corresponding to the map data searched through the searches of the respective segments, reading data stored in the triggered memory chips, and transferring the read data to the host.

20 Claims, 12 Drawing Sheets

(56) References Cited

U.S. PATENT DOCUMENTS

2013/0283002 A1* 10/2013 Chachad .............. G11C 7/1039
711/169

* cited by examiner

MEMORY SYSTEM FOR PROCESSING DATA EFFICIENTLY BY SEARCHING SEGMENTS OF DATA AND OPERATING METHOD THEREOF

CROSS REFERENCE TO RELATED APPLICATIONS

The present application claims priority of Korean Patent Application No. 10-2015-0102948, filed on Jul. 21, 2015, which is incorporated herein by reference in its entirety.

BACKGROUND

1. Field

Exemplary embodiments of the present invention relate to a memory system, and more particularly, to a memory system for processing data, a memory device and an operating method thereof.

2. Description of the Related Art

The computer environment paradigm has shifted to ubiquitous computing systems that can be used anytime and anywhere. As a result, use of portable electronic devices such as mobile phones digital cameras, and notebook computers continues to increase rapidly. Portable electronic devices generally use a memory system having one or more semiconductor memory device as data storage devices. Data storage devices may be used as a main memory device or an auxiliary memory device of a portable electronic device.

Data storage devices using semiconductor memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

SUMMARY

Various embodiments of the invention are directed to a memory system, a memory device and an operating method thereof providing rapid and efficient processing of data.

In an embodiment, a memory system may include: a memory device including a plurality of pages having a plurality of memory cells coupled to a plurality of word lines and suitable for storing read data and write data requested from a host, a plurality of memory blocks each including the pages, a plurality of planes each including the memory blocks, and a plurality of memory chips each including the planes; and a controller suitable for searching map data of the read data corresponding to a read command received from the host on a basis of a plurality of segments, triggering memory chips corresponding to the map data searched through the searches of the respective segments, reading data stored in the triggered memory chips, and transferring the read data to the host.

The controller may overlap and search first map data corresponding to first and second memory chips through search of a first segment.

The first map data may include the entire map data on first read data stored in the first memory chip and partial map data on second read data stored in the second memory chip, in the read data.

While reading the first read data from the first memory chip, the controller may overlap and search second map data corresponding to the second memory chip and a third memory chip through search of a second segment, and trigger the second and third memory chips according to the first map and second map data.

The second map data may include the other map data on the second read data and partial map data on third read data stored in the third memory chip.

The first to third memory chips may be sequentially triggered according to the first and second map data, and the controller may sequentially read the first to third read data from the triggered first to third memory chips.

While transferring the first read data to the host, the controller may read the second read data from the triggered second memory chip.

While transferring the first read data to the host, the controller may overlap and search third map data corresponding to the third memory chip and a fourth memory chip through search of a third segment, and sequentially trigger the third and fourth memory chips according to the second and third map data.

The controller may read the third read data from the triggered third memory chip while transferring the second read data to the host, and read fourth data stored in the triggered fourth memory chip while transferring the this read data to the host.

The segments may be determined according to read times for the data stored in the memory chips, and the controller may overlap and search map data on memory chips from which data are successively read, through the searches of the respective segments.

In an embodiment, an operating method of a memory system may include: checking read data corresponding to a read command received from a host, for a plurality of pages included in each of a plurality of memory blocks included in a plurality of memory chips of a memory device and each including a plurality of memory cells coupled to a plurality of word lines; searching map data corresponding to the read data on a basis of a plurality of segments; triggering memory chips corresponding to the respective map data searched through the searches of the respective segments; and reading data stored in the triggered memory chips, and providing the read data to the host.

The searching of the map data, may include overlapping and searching first map data corresponding to first and second memory chips through search of a first segment.

The first map data may include the entire map data on first read data stored in the first memory chip and partial map data on second read data stored in the second memory chip, in the read data.

The searching of the map data may include overlapping and searching second map data corresponding to the second memory chip and a third memory chip through search of a second segment, while reading the first read data from the first memory chip, and the triggering of the memory chips may include triggering the second and third memory chips according to the first and second map data, while reading the first read data from the first memory chip.

The second map data may include the other map data on the second read data and partial map data on third read data stored in the third memory chip.

The first to third memory chips may be sequentially triggered according to the first and second map data, and the reading of the data may include sequentially reading the first to third read data from the triggered first to third memory chips, and transferring the read data to the host.

The reading of the data may include reading the second read data from the triggered second memory chip while transferring the first read data to the host.

The searching of the map data may include overlapping and searching third map data corresponding to the third memory chip and a fourth memory chip through search of a third segment while transferring the first read data to the host, and the triggering of the memory chips may include sequentially triggering the third and fourth memory chips according to the second and third map data, while transferring the first read data to the host.

The reading of the data may include reading the third read data from the triggered third memory chip while transferring the second read data to the host, and reading fourth read data stored in the triggered fourth memory chip while transferring the third read data to the host.

The segments may be determined according to read times for the data stored in the memory chips, and the searching of the map data may include overlapping and searching map data on memory chips from which data are successively read, through the searches of the respective segments.

DETAILED DESCRIPTION

Figure 1:
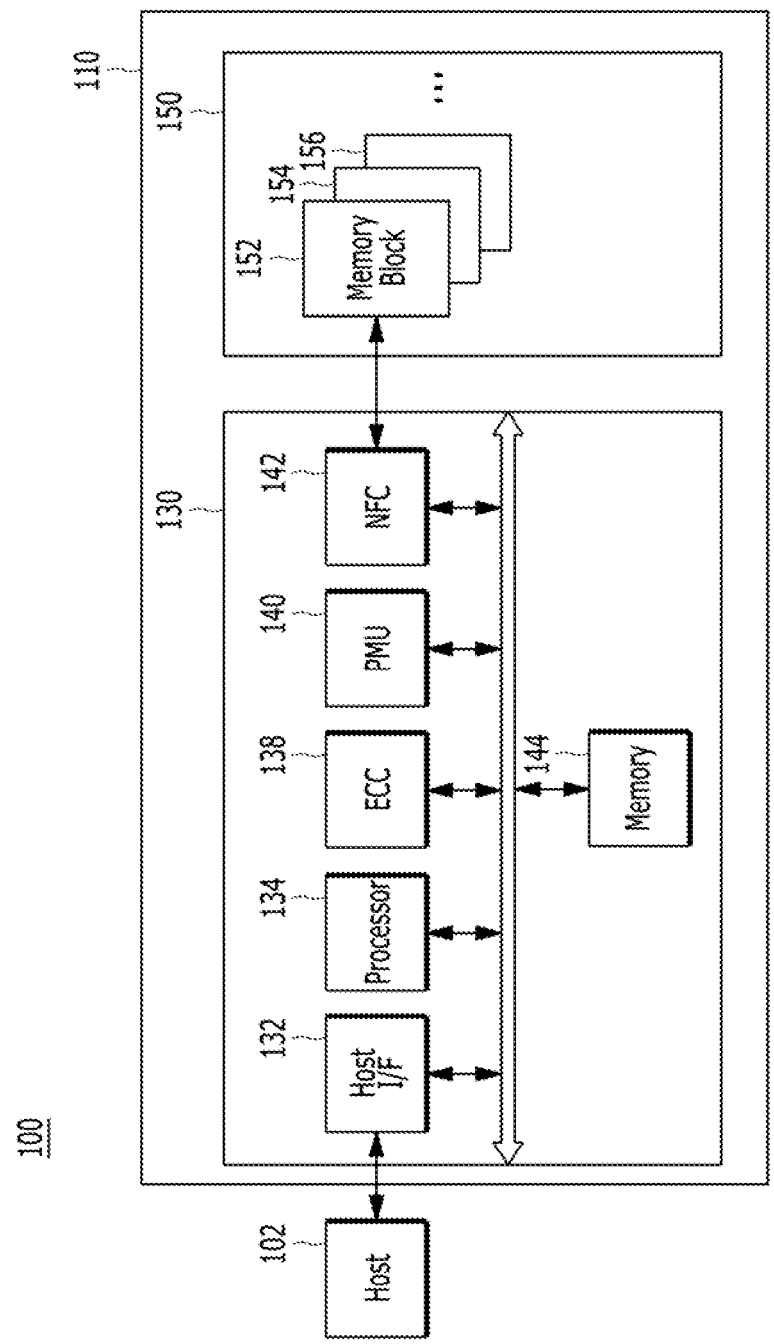
FIG. 1 is a diagram illustrating a data processing system including a memory system, according to an embodiment of the invention.

Various embodiments of the invention will be described below in more detail with reference to the accompanying drawings. The present invention may, however, be embodied in different forms and should not be construed as limited to the embodiments set forth herein. Rather, these embodiments are provided so that this disclosure will be thorough and complete. Throughout the disclosure, like reference numerals refer to like parts throughout the various figures and embodiments of the present invention.

The drawings are not necessarily to scale and in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween. Furthermore, when it is described that one "comprises" (or "includes") or "has" some elements, it should be understood that it may comprise (or include) or have only those elements, or it may comprise (or include) or have other elements as well as those elements if there is no specific limitation. The terms of singular form may include plural forms unless stated otherwise.

Referring to FIG. 1, a data processing system 100 is provided according to an embodiment of the invention. The data processing system may include a host 102 and a memory system 110.

The host 102 may include, for example, a portable electronic device such as a mobile phone, an MP3 player and a laptop computer or an electronic device such as a desktop computer, a game player, a TV and a projector.

The memory system 110 may operate in response to a request from the host 102, and in particular, store data to be accessed by the host 102.

The memory system 110 may be used as a main memory system or an auxiliary memory system of the host 102. The memory system 110 may be implemented with any one of various kinds of storage devices according to the protocol of a host interface to be electrically coupled with the host 102. The memory system 110 may be implemented with any one of various kinds of storage devices such as a solid state drive (SSD) a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and so forth.

The storage devices for the memory system 110 may be implemented with a volatile memory device such as a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM) and a resistive RAM (RRAM).

The memory system 110 may include a memory device 150, which stores data to be accessed by the host 102, and a controller 130, which may control storage of data in the memory device 150.

The controller 130 and the memory device 150 may be integrated into one semiconductor device. For instance, the controller 130 and the memory device 150 may be integrated into one semiconductor device and configure a solid state drive (SSD). When the memory system 110 is used as the SSD, the operation speed of the host 102 that is electrically coupled with the memory system 110 may be significantly increased.

The controller 130 and the memory device 150 may be integrated into one semiconductor device and configure a memory card. The controller 130 and the memory card 150 may be integrated into one semiconductor device and configure a memory card such as a Personal Computer Memory Card International Association (PCMCIA) card, a compact flash (CF) card, a smart media (SM) card (SMC), a memory sock, a multimedia card (MMC), an RS-MMC and a micro-MMC, a secure digital (SD) card, a mini-SD, a micro-SD and an SDHC, and a universal flash storage (UFS) device.

For instance, the memory system 110 may be or comprise a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a three-dimensional (3D) television, a smart television, a digital audio recorder, a digital audio player, a digital picture recorder, a digital picture player, a digital video recorder, a digital video player, a storage comprising a data center, a device capable of transmitting and receiving information under a wireless environment, one of various electronic devices configuring a home network, one of various electronic devices configuring a computer network, one of various electronic devices configuring a telematics network, an RFID device, or one of various component elements configuring a computing system.

The memory device 150 of the memory system 110 may retain stored data when power supply is interrupted. For example, the memory device may store data provided from the host 102 during a write operation, and provide the stored data to the host 102 during a read operation. The memory device 150 may include a plurality of memory blocks 152, 154 and 156. Each of the memory blocks 152, 154 and 156 may include a plurality of pages. Each of the pages may include a plurality of memory cells to which a plurality of word lines (WL) are electrically coupled. The memory device 150 may be a nonvolatile memory device, for example, a flash memory. The flash memory may have a three-dimensional (3D) stack structure. An example of a three-dimensional (3D) stack structure of the memory device 150 will be described later in detail with reference to FIGS. 2 to 11.

The controller 130 of the memory system 110 may control the memory device 150 in response to a request from the host 102. The controller 130 may provide the data read from the memory device 150, to the host 102, and store the data provided from the host 102 into the memory device 150. The controller 130 may control overall operations of the memory device 150, such as read, write, program and erase operations.

For example, the controller 130 may include a host interface unit 132, a processor 134, an error correction code (FCC) unit 138, a power management unit 140, a NAND flash controller 142, and a memory 144.

The host interface unit 132 may process commands and data provided from the host 102, and may communicate with the host 102 through at least one of various interface protocols such as universal serial bus (USB), multimedia card (MMC), peripheral component interconnect-express (PCI-E), serial attached SCSI (SA), serial advanced technology attachment (SATA), parallel advanced technology attachment (PAA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM) and so on. The ECC unit 138 may include all circuits, systems or devices for the error correction operation.

The PMU 140 may provide and manage power for the controller 130, that is, power for the component elements included in the controller 130.

The NEC 142 may serve as a memory interface between the controller 130 and the memory device 150 to allow the controller 130 to control the memory device 150 in response to a request from the host 102. The NEC 142 may generate control signals for the memory device 150 and process data under the control of the processor 134 when the memory device 150 is a flash memory and, in particular, when the memory device 150 is a NAND flash memory.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read, write, program and erase operations.

The memory 144 may be implemented with volatile memory. The memory 144 may be implemented with a static random access memory (SRAM) or a dynamic random access memory (DRAM). As described above the memory 144 may store data used by the host 102 and the memory device 150 for the read and write operations. To store the data, the memory 144 may include a program memory, a data memory, a write buffer, a read buffer, a map buffer, and so forth.

The processor 134 may control general operations of the memory system 110, and a write operation or a read operation for the memory device 150, in response to a write request or a read request from the host 102. The processor 134 may drive firmware, which is referred to as a flash translation layer (FTL), to control the general operations of the memory system 110. The processor 134 may be implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fail seriously deteriorates the utilization efficiency of the memory device 150 having a 3D stack structure and the reliability of the memory system 100, and thus reliable bad block management is required.

Figure 2:
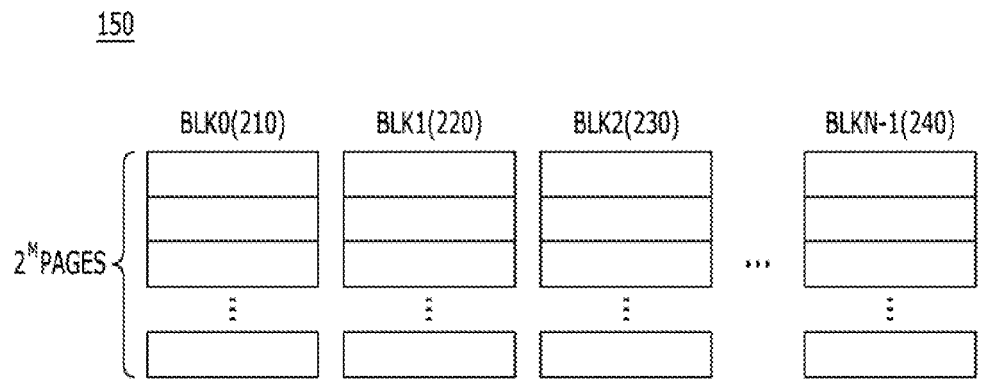
FIG. 2 is a diagram illustrating a memory device employed in the memory system shown in FIG. 1, according to an embodiment of the invention.

FIG. 2 is a schematic diagram illustrating the memory device 150 shown in FIG. 1.

Referring to FIG. 2, the memory device 150 may include a plurality of memory blocks, for example, zeroth to $(N-1)^{th}$ blocks 210 to 240. Each of the plurality of memory blocks 210 to 240 may include a plurality of pages, for example, $2^M$ number of pages ($2^M$ PAGES), to which the present invention will not be limited. Each of the plurality of pages may include a plurality of memory cells to which a plurality of word lines are electrically coupled.

Also, the memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. An MLC memory block including a plurality of pages which are implemented with memory cells that are each capable of storing 3-bit data may be defined as a triple level cell (TLC) memory block.

Each of the plurality of memory blocks 210 to 240 may store the data provided from the host device 102 during a write operation and may provide stored data to the host 102 during a read operation.

Figure 3:
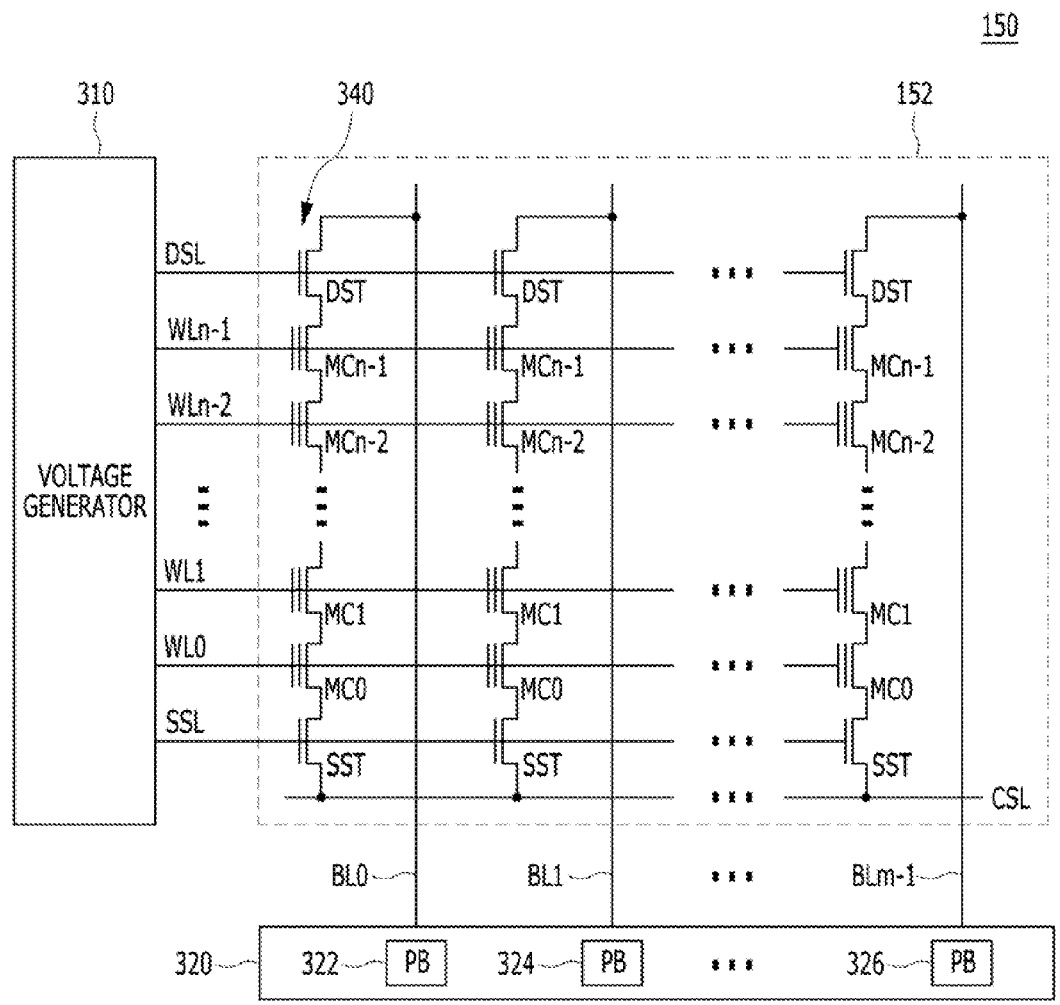
FIG. 3 is a circuit diagram illustrating a memory block in a memory device, according to an embodiment of the invention.

FIG. 3 is a circuit diagram illustrating one of the plurality of memory blocks 152 to 156 shown in FIG. 1, according to an embodiment of the invention.

Referring to FIG. 3 the memory block 152 of the memory device 150 may include a plurality of cell strings 340, which are electrically coupled to bit lines BL0 to BLm-1 respectively. The cell string 340 of each column may include at least one drain select transistor DST and at least one source select transistor SST. A plurality of memory cells or a plurality of memory cell transistors MC0 to MCn-1 may be electrically coupled in series between the select transistors DST and SST. The respective memory cells MC0 to MCn-1 may be configured by multi-level cells (MLC) each of which stores data information of a plurality of bits. The respective memory cells MC0 to MCn-1 may be configured also by single-level cells (SLC) each of which may stores a single bit of information. The strings 340 may be electrically coupled to the corresponding bit lines BL0 to BLm-1, respectively. For reference, in FIG. 3, 'DSL' denotes a drain select line, denotes a source select line, and 'CSL' denotes a common source line.

While FIG. 3 shows, as an example, the memory block 152, which is configured by NAND flash memory cells, it is to be noted that the memory block 152 is not limited to NAND flash memory. For example, the memory block 152 may be realized by NOR flash memory, hybrid flash memory in which at least two kinds of memory cells are combined or one-NAND flash memory in which a controller is built in a memory chip. The operational characteristics of a semiconductor device may be applied to not only a flash memory device in which a charge storing layer is configured by conductive floating gates but also to a charge trap flash (CTF) in which a charge storing layer is configured by a dielectric layer.

A voltage supply block 310 of the memory device 150 may provide word line voltages, for example, a program voltage a read voltage and a pass voltage, to be supplied to respective word lines according to an operation mode and voltages to be supplied to bulks, for example, well regions in which the memory cells are formed. The voltage supply block 310 may perform a voltage generating operation under the control of a control circuit (not shown). The voltage supply block 310 may generate a plurality of variable read voltages to generate a plurality of read data, select one of the memory blocks or sectors of a memory cell array under the control of the control circuit, select one of the word lines of the selected memory block, and provide the word line voltages to the selected word line and unselected word lines.

A read/write circuit 320 of the memory device 150 may be controlled by the control circuit, and may serve as a sense amplifier or a write driver according to an operation mode. During a verification/normal read operation, the read/write circuit 320 may serve as a sense amplifier for reading data from the memory cell array. Also, during a program operation, the read/write circuit 320 may serve as a write driver, which drives bit lines according to data to be stored in the memory cell array. The read/write circuit 320 may receive data to be written in the memory cell array, from a buffer (not shown), during the program operation, and may drive the bit lines according to the inputted data. For example, the read/write circuit 320 may include a plurality of page buffers 322, 324 and 326 respectively corresponding to columns (or bit lines) or pairs of columns (or pairs of bit lines), and a plurality of latches (not shown) may be included in each of the page buffers 322, 324 and 326.

FIGS. 4 to 11 are schematic diagram illustrating the memory device 150 shown in FIG. 1.

Figure 4:
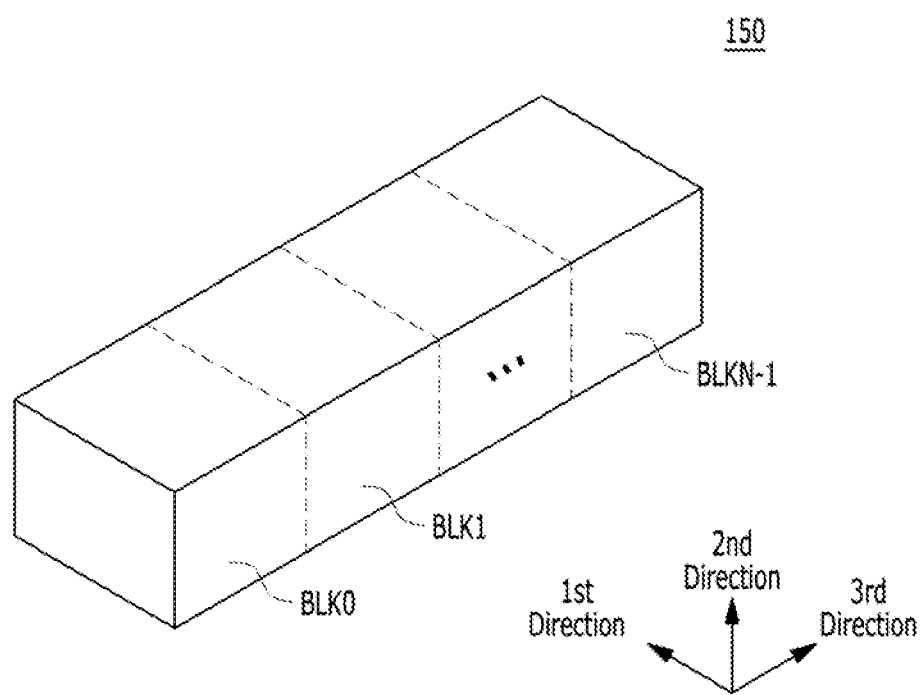
FIGS. 4 to 11 are diagrams schematically illustrating the memory device shown in FIG. 2, according to an embodiment of the invention.

FIG. 4 is a block diagram illustrating an example of the plurality of memory blocks 152 to 156 of the memory device 150 shown in FIG. 1.

Referring to FIG. 4, the memory device 150 may include a plurality of memory blocks BLK0 to BLKN-1, and each of the memory blocks BLK0 to BLKN-1 may be realized in a three-dimensional (3D) structure or a vertical structure. The respective memory blocks BLK0 to BLKN-1 may include structures, which extend in first to third directions, for example, an x-axis direction, a y-axis direction and a z-axis direction.

The respective memory blocks BLK0 to BLKN-1 may include a plurality of NAND strings NS, which extend in the second direction. The plurality of NAND strings NS may be provided in the first direction and the third direction. Each NAND string NS may be electrically coupled to a bit line BL, at least one source select line SSL, at least one ground select line GSL, a plurality of word lines WL, at least one dummy word line DWL and a common source line CSL. The respective memory blocks BLK0 to BLKN-1 may be electrically coupled to a plurality of bit lines BL, a plurality of source select lines SSL, a plurality of ground select lines GSL, a plurality of word lines WL, a plurality of dummy word lines DWL, and a plurality of common source lines CSL.

Figure 5:
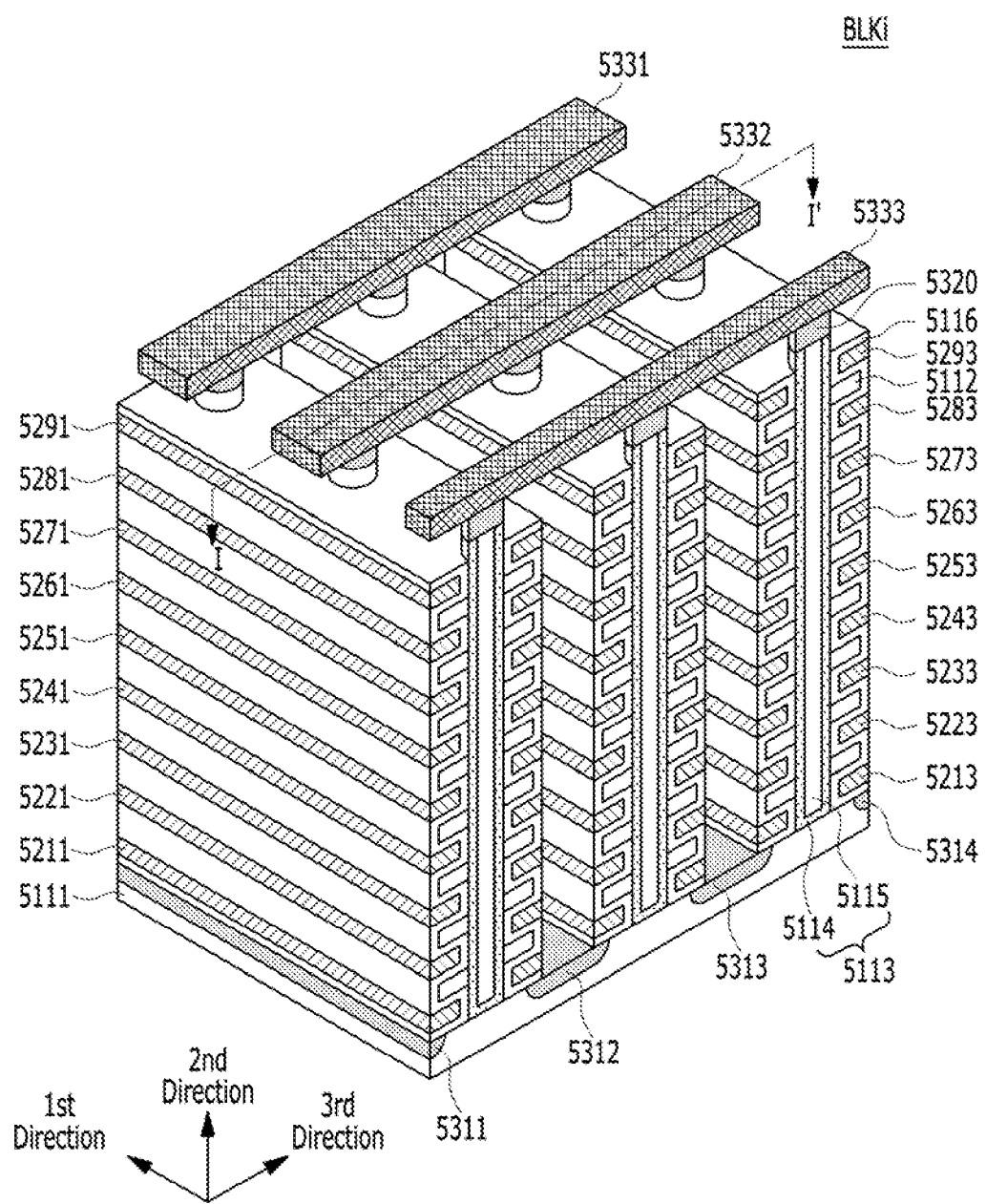
Figure 6:
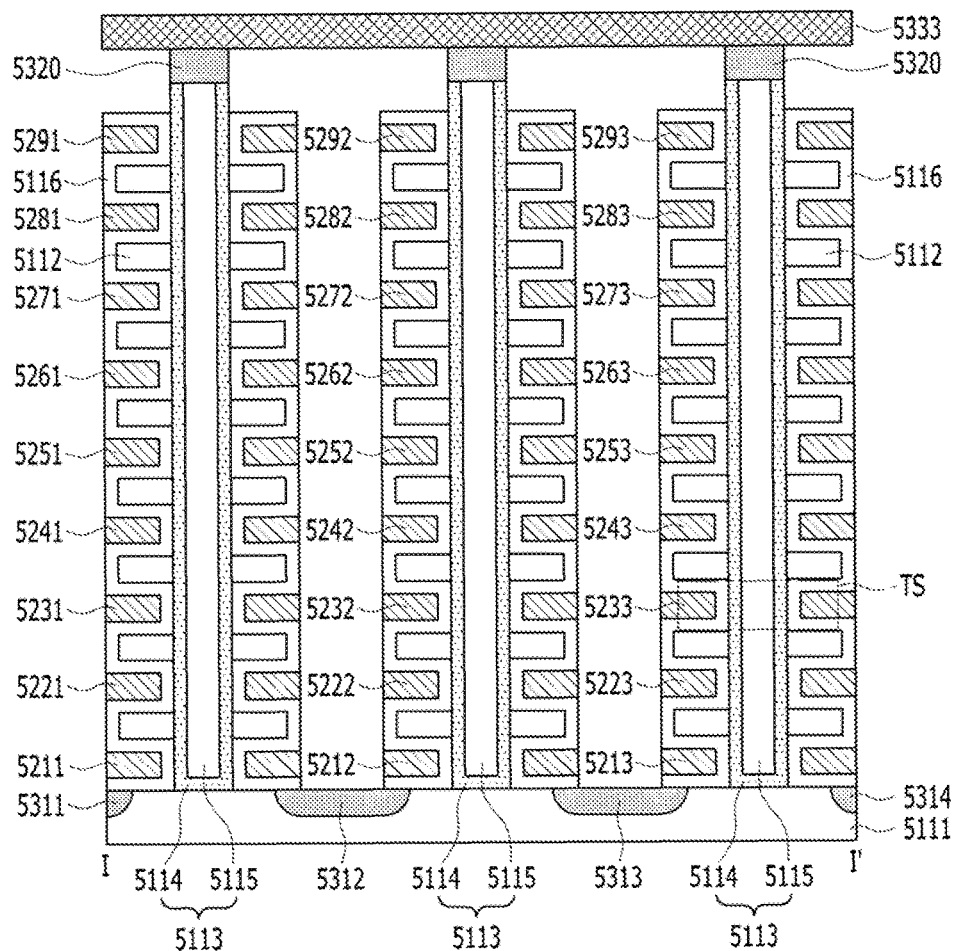

FIG. 5 is a perspective view of one BLKi of the plural memory blocks BLK0 to BLKN-1 shown in FIG. 4. FIG. 6 is cross-sectional view taken along a line I-I' of the memory block BLKi shown in FIG. 5.

Referring to FIGS. 5 and 6, a memory block BLKi among the plurality of memory blocks of the memory device 150 may include a structure, which extends in the first to third directions.

A substrate 5111 may be provided. The substrate 5111 may include a silicon material doped with a first type impurity. The substrate 5111 may include a silicon material doped with a p-type impurity or may be a p-type well, for example, a pocket p-well, and include an n-type well which surrounds the p-type well. While the embodiment shows that the substrate 5111 is p-type silicon, it is to be noted that the substrate 5111 is not limited to being p-type silicon.

A plurality of doping regions 5311 to 5314, which extend in the first direction, may be provided over the substrate 5111. The plurality of doping regions 5311 to 5314 may contain a second type of impurity that is different from the impurity used in the substrate 5111. The plurality of doping regions 5311 to 5314 may be doped with an n-type impurity. While it is assumed here, that first to fourth doping regions 5311 to 5314 are n-type, it is to be noted that the first to fourth doping regions 5311 to 5314 are not limited to being n-type.

In the region over the substrate 5111 between the first and second doping regions 5311 and 5312, a plurality of dielectric materials 5112, which extend in the first direction, may be sequentially provided in the second direction. The dielectric materials 5112 and the substrate 5111 may be separated from one another by a predetermined distance in the second direction. The dielectric materials 5112 may be separated from one another by a predetermined distance in the second direction. The dielectric materials 5112 may include a dielectric material such as silicon oxide. It is to be noted that other suitable dielectric materials may also be used.

In the region over the substrate 5111 between the first and second doping regions 5311 and 5312, a plurality of pillars 5113, which are sequentially disposed in the first direction and pass through the dielectric materials 5112 in the second direction, may be provided. The plurality of pillars 5113 may respectively pass through the dielectric materials 5112 and may be electrically coupled with the substrate 5111. Each pillar 5113 may be configured by a plurality of materials. The surface layer 5114 of each pillar 5113 may include a silicon material doped with the first type of impurity. The surface layer 5114 of each pillar 5113 may include a silicon material doped with the same type of impurity as the substrate 5111. While it is assumed here that the surface layer 5114 of each pillar 5113 may include p-type silicon, the surface layer 5114 of each pillar 5113 is not limited to being p-type silicon.

An inner layer 5115 of each pillar 5113 may be formed of a dielectric material. The inner layer 5115 of each pillar 5113 may be filled by a dielectric material such as silicon oxide.

In the region between the first and second doping regions 5311 and 5312, a dielectric layer 5116 may be provided along the exposed surfaces of the dielectric materials 5112, the pillars 5113 and the substrate 5111. The thickness of the dielectric layer 5116 may be less than half of the distance between the dielectric materials 5112. A region in which a material other than the dielectric material 5112 and the dielectric layer 5116 may be disposed, may be provided between (i) the dielectric layer 5116 provided over the bottom surface of a first dielectric material of the dielectric materials 5112 and (ii) the dielectric layer 5116 provided over the top surface of a second dielectric material of the dielectric materials 5112. The dielectric materials 5112 lie below the first dielectric material.

In the region between the first and second doping regions 5311 and 5312, conductive materials 5211 to 5291 may be provided over the exposed surface of the dielectric layer 5116. The conductive material 5211 which extends in the first direction may be provided between the dielectric material 5112 adjacent to the substrate 5111 and the substrate 5111. In particular, the conductive material 5211 which extends in the first direction may be provided between (i) the dielectric layer 5116 disposed over the substrate 5111 and (ii) the dielectric layer 5116 disposed over the bottom surface of the dielectric material 5112 adjacent to the substrate 5111.

The conductive material which extends in the first direction may be provided between (i) the dielectric layer 5116 disposed over the top surface of one of the dielectric materials 5112 and (ii) the dielectric layer 5116 disposed over the bottom surface of another dielectric material of the dielectric materials 5112, which is disposed over the certain dielectric material 5112. The conductive materials 5221 to 5281, which extend in the first direction may be provided between the dielectric materials 5112. The conductive material 5291, which extends in the first direction, may be provided over the uppermost dielectric material 5112. The conductive materials 5211 to 5291, which extend in the first direction, may be a metallic material. The conductive materials 5211 to 5291, which extend in the first direction, may be a conductive material such as polysilicon.

In the region between the second and third doping regions 5312 and 5313, the same structures as the structures between the first and second doping regions 5311 and 5312 may be provided. For example, in the region between the second and third doping regions 5312 and 5313, the plurality of dielectric materials 5112 which extend in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5212 to 5292 which extend in the first direction may be provided.

In the region between the third and fourth doping regions 5313 and 5314, the same structures as between the first and second doping regions 5311 and 5312 may be provided. For example, in the region between the third and fourth doping regions 5313 and 5314, the plurality of dielectric materials 5112 which extend in the first direction, the plurality of pillars 5113 which are sequentially arranged in the first direction and pass through the plurality of dielectric materials 5112 in the second direction, the dielectric layer 5116 which is provided over the exposed surfaces of the plurality of dielectric materials 5112 and the plurality of pillars 5113, and the plurality of conductive materials 5213 to 5293 which extend in the first direction may be provided.

Drains 5320 may be respectively provided over the plurality of pillars 5113. The drains 5320 may be silicon materials doped with second type impurities. The drains 5320 may be silicon materials doped with n-type impurities. While it is assumed for the sake of convenience that the drains 5320 include n-type silicon, it is to be noted that the drains 5320 are not limited to being n-type silicon. The width of each drain 5320 may be larger than the width of each corresponding pillar 5113. Each drain 5320 may be provided in the shape of a pad over the top surface of each corresponding pillar 5113.

Conductive materials 5331 to 5333, which extend in the third direction, may be provided over the drains 5320. The conductive materials 5331 to 5333 may be sequentially disposed in the first direction. The respective conductive materials 5331 to 5333 may be electrically coupled with the drains 5320 of corresponding regions. The drains 5320 and the conductive materials 5331 to 5333, which extend in the third direction, may be electrically coupled with through contact plugs. The conductive materials 5331 to 5333 may be or include a metallic material. The conductive materials 5331 to 5333 may be a conductive material such as polysilicon.

In FIGS. 5 and 6, the respective pillars 5113 may form strings together with the dielectric layer 5116 and the conductive materials 5211 to 5291, 5212 to 5292 and 5213 to 5293, which extend in the first direction. The respective pillars 5113 may form NAND strings NS together with the dielectric layer 5116 and the conductive materials 5211 to 5291, 5212 to 5292 and 5213 to 5293 which extend in the first direction. Each NAND string NS may include a plurality of transistor structures TS.

Figure 7:
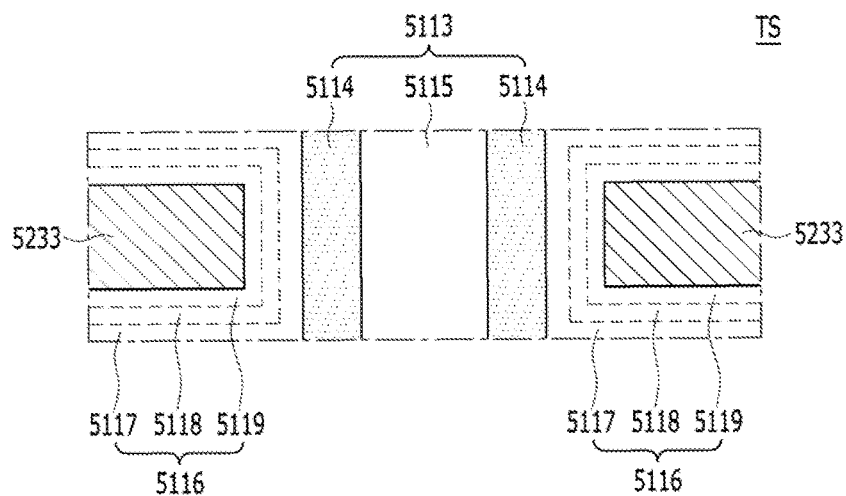

FIG. 7 is a cross-sectional view of the transistor structure TS shown in FIG. 6. Referring to FIG. 7 in the transistor structure TS, the dielectric layer 5116 may include first to third sub dielectric layers 5117, 5118 and 5119.

The surface layer 5114 of p-type silicon in each of the pillars 5113 may serve as a body. The first sub dielectric layer 5117 adjacent to the pillar 5113 may serve as a tunneling dielectric layer, and may include a thermal oxidation layer.

The second sub dielectric layer 5118 may serve as a charge storing layer. The second sub dielectric layer 5118 may serve as a charge capturing layer, and may include a nitride layer or a metal oxide layer such as an aluminum oxide layer, a hafnium oxide layer, or the like.

The third sub dielectric layer 5119 adjacent to the conductive material 5233 may serve as a blocking dielectric layer. The third sub dielectric layer 5119 adjacent to the conductive material 5233, which extends in the first direction, may be formed as a single layer or multiple layers. The third sub dielectric layer 5119 may be a high-k dielectric layer such as an aluminum oxide layer, a hafnium oxide layer, or the like, which has a dielectric constant greater than the first and second sub dielectric layers 5117 and 5118.

The conductive material 5233 may serve as a gate or a control gate. That is, the gate or the control gate 5233, the blocking dielectric layer 5119, the charge storing layer 5118, the tunneling dielectric layer 5117 and the body 5114 may form a transistor or a memory cell transistor structure. For example, the first to third, sub dielectric layers 5117 to 5119 may form an oxide-nitride-oxide (ONO) structure. In the embodiment shown for the sake of convenience, the surface layer 5114 of p-type silicon in each of the pillars 5113 will be referred to as a body in the second direction.

The memory block BLKi may include the plurality of pillars 5113. Namely, the memory block BLKi may include the plurality of NAND strings NS. For example, the memory block BLKi may include the plurality of NAND strings NS which extend in the second direction or a direction perpendicular to the substrate 5111.

Each NAND string NS may include the plurality of transistor structures TS which are disposed in the second direction. At least one of the plurality of transistor structures TS of each NAND string NS may serve as a string source transistor SST. At least one of the plurality of transistor structures TS of each NAND string NS may serve as a ground select transistor GST.

The gates or control gates may correspond to the conductive materials 5211 to 5291, 5212 to 5292 and 5213 to 5293, which extend in the first direction. For example, the gates or the control gates may extend in the first direction and form word lines and at least two select lines, at least one source select line SSL and at least one ground select line GSL.

The conductive materials 5331 to 5333, which extend in the third direction, may be electrically coupled to one end of the NAND strings NS. The conductive materials 5331 to 5333 which extend in the third direction, may serve as bit lines BL. That is, in one memory block BLKi, the plurality of NAND strings NS may be electrically coupled to one bit line BL.

The second type doping regions 5311 to 5314, which extend in the first direction, may be provided to the other ends of the NAND strings NS. The second type doping regions 5311 to 5314, which extend in the first direction, may serve as common source lines CSL.

The memory block BLKi may include a plurality of NAND strings NS which extend in a direction perpendicular to the substrate 5111, the second direction, and may serve as a NAND flash memory block, for example, of a charge capturing type memory, in which a plurality of NAND strings NS are electrically coupled to one bit line BL.

While FIGS. 5 to 7 show that the conductive materials 5211 to 5291, 5212 to 5292 and 5213 to 5293, which extend in the first direction, are provided in 9 layers, it is to be noted that the conductive materials are not limited to being provided in 9 layers. For example, conductive materials extending in the first direction may be provided in 8 layers, 16 layers or any multiple of layers. In other words, in one NAND string NS, the number of transistors may be 8, 16 or more.

Also while FIGS. 5 to 7 illustrate that 3 NAND strings NS are electrically coupled to one bit line BL, it is to be noted that the embodiment is not limited in such a way. In the memory block BLKi, m number of NAND strings NS may be electrically coupled to one bit line BL, m being a positive integer. According to the number of NAND strings NS which are electrically coupled to one bit line BL, the number of conductive materials 5211 to 5291, 5212 to 5292 and 5213 to 5293 which extend in the first direction and the number of common source lines 5311 to 5314 may be controlled as well.

Further, while it is illustrated in FIGS. 5 to 7 that 3 NAND strings NS are electrically coupled to one conductive material which extends in the first direction, it is to be noted that the embodiment is not limited to having 3 NAND strings NS electrically coupled to one conductive material which extends in the first direction. For example, n number of NAND strings NS may be electrically coupled to one conductive material which extends in the first direction, n being a positive integer. According to the number of NAND strings NS which are electrically coupled to one conductive material which extends in the first direction, the number of bit lines 5331 to 5333 may be controlled as well.

Figure 8:
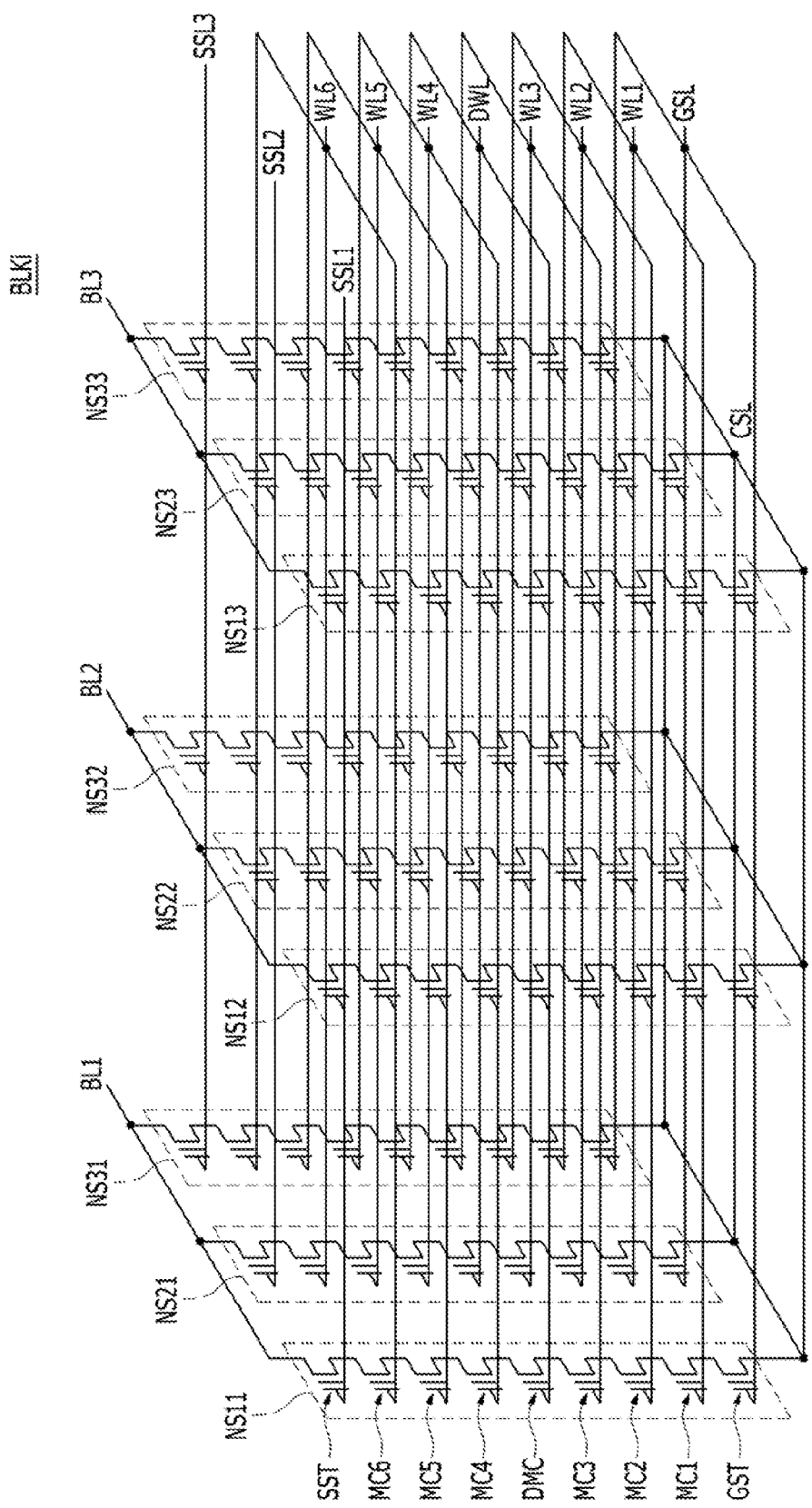

FIG. 8 is an equivalent circuit diagram illustrating the memory block BLKi having a first structure described with reference to FIGS. 5 to 7.

Referring to FIG. 8, in a block BLKi having the first structure, NAND strings NS11 to NS31 may be provided between a first bit line BL1 and a common source line CSL. The first bit line BL1 may correspond to the conductive material 5331 of FIGS. 5 and 6, which extends in the third direction. NAND strings NS12 to NS32 may be provided between a second bit line BL2 and the common source line CSL. The second bit line BL2 may correspond to the conductive material 5332 of FIGS. 5 and 6, which extends in the third direction. NAND strings NS13 to NS33 may be provided between a third bit line BL3 and the common source line CSL. The third bit line BL3 may correspond to the conductive material 5333 of FIGS. 5 and 6, which extends in the third direction.

A source select transistor SST of each NAND string NS may be electrically coupled to a corresponding bit line BL. A ground select transistor GST of each NAND string NS may be electrically coupled to the common source line CSL. Memory cells MC may be provided between the source select transistor SST and the ground select transistor GST of each NAND string NS.

In this example, NAND strings NS may be defined by units of rows and columns and NAND strings NS, which are electrically coupled to one bit line may form one column. The NAND strings NS11 to NS31 which are electrically coupled to the first bit line BL1 may correspond to a first column, the NAND strings NS12 to NS32 which are electrically coupled to the second bit line BL2 may correspond to a second column, and the NAND strings NS13 to NS33 which are electrically coupled to the third bit line BL3 may correspond to a third column. NAND strings NS which are electrically coupled to one source select line SSL may form one row. The NAND strings NS11 to NS13 which are electrically coupled to a first source select line SSL1 may form a first row the NAND strings NS21 to NS23 which are electrically coupled to a second source select line SSL2 may form a second row, and the NAND strings NS31 to NS33 which are electrically coupled to a third source select line SSL3 may form a third row.

In each NAND string NS a height may be defined. In each NAND string NS, the height of a memory cell MC1 adjacent to the ground select transistor GST may have a value '1'. In each NAND string NS, the height of a memory cell may increase as the memory cell gets closer to the source select transistor SST when measured from the substrate 5111. In each NAND string NS, the height of a memory cell MC6 adjacent to the source select transistor SST may be 7.

The source select transistors SST of the NAND strings NS in the same row may share the source select line SSL. The source select transistors SST of the NAND strings NS in different rows may be respectively electrically coupled to the different source select lines SSL1, SSL2 and SSL3.

The memory cells at the same height in the NAND strings NS in the same row may share a word line WL. That is, at the same height, the word lines WL electrically coupled to the memory cells MC of the NAND strings NS in different rows may be electrically coupled. Dummy memory cells DMC at the same height in the NAND strings NS of the same row may share a dummy word line DWL. Namely, at the same height or level, the dummy word lines DWL electrically coupled to the dummy memory cells DMC of the NAND strings NS in different rows may be electrically coupled.

The word lines WL or the dummy word lines DWL located at the same level or height or layer may be electrically coupled with one another at layers where the conductive materials 5211 to 5291, 5212 to 5292 and 5213 to 5293 which extend in the first direction may be provided. The conductive materials 5211 to 5291, 5212 to 5292 and 5213 to 5293 which extend in the first direction, may be electrically coupled in common to upper layers through contacts. At the upper layers, the conductive materials 5211 to 5291, 5212 to 5292 and 5213 to 5293, which extend in the first direction may be electrically coupled. The ground select transistors GST of the NAND strings NS in the same row may share the ground select line GSL. Further, the ground select transistors GST of the NAND strings NS in different rows may share the ground select line GSL. That is, the NAND strings NS11 to NS13, NS21 to NS23 and NS31 to NS33 may be electrically coupled to the ground select line GSL.

The common source line CSL may be electrically coupled to the NAND strings NS. Over the active regions and over the substrate 5111, the first to fourth doping regions 5311 to 5314 may be electrically coupled. The first to fourth doping regions 5311 to 5314 may be electrically coupled to an upper layer through contacts and, at the upper layer, the first to fourth doping regions 5311 to 5314 may be electrically coupled.

For example, as shown in FIG. 8, the word lines WL of the same height or level may be electrically coupled. Accordingly, when a word line WL at a specific height is selected, all NAND strings NS which are electrically coupled to the word line WL may be selected. The NAND strings NS in different rows may be electrically coupled to different source select lines SSL. Accordingly, among the NAND strings NS electrically coupled to the same word line WL, by selecting one of the source select lines SSL1 to SSL3, the NAND strings NS in the unselected rows may be electrically isolated from the bit lines BL1 to BL3. In other words, by selecting one of the source select lines SSL1 to SSL3, a row of NAND strings NS may be selected. Moreover, by selecting one of the bit lines BL1 to BL3 the NAND strings NS in the selected rows may be selected in units of columns.

In each NAND string NS, a dummy memory cell DMC may be provided. In FIG. 8, the dummy memory cell DMC may be provided between a third memory cell MC3 and a fourth memory cell MC4 in each NAND string NS. That is, first to third memory cells MC1 to MC3 may be provided between the dummy memory cell DMC and the ground select transistor GST. Fourth to sixth memory cells MC4 to MC6 may be provided between the dummy memory cell DMC and the source select transistor SST. The memory cells MC of each NAND string NS may be divided into memory cell groups by the dummy memory cell DMC. In the divided memory cell groups, memory cells, for example, MC1 to MC3, adjacent to the ground select transistor GST may be referred to as a lower memory cell group, and memory cells, for example, MC4 to MC6, adjacent to the string select transistor SST may be referred to as an upper memory cell group.

Figure 9:
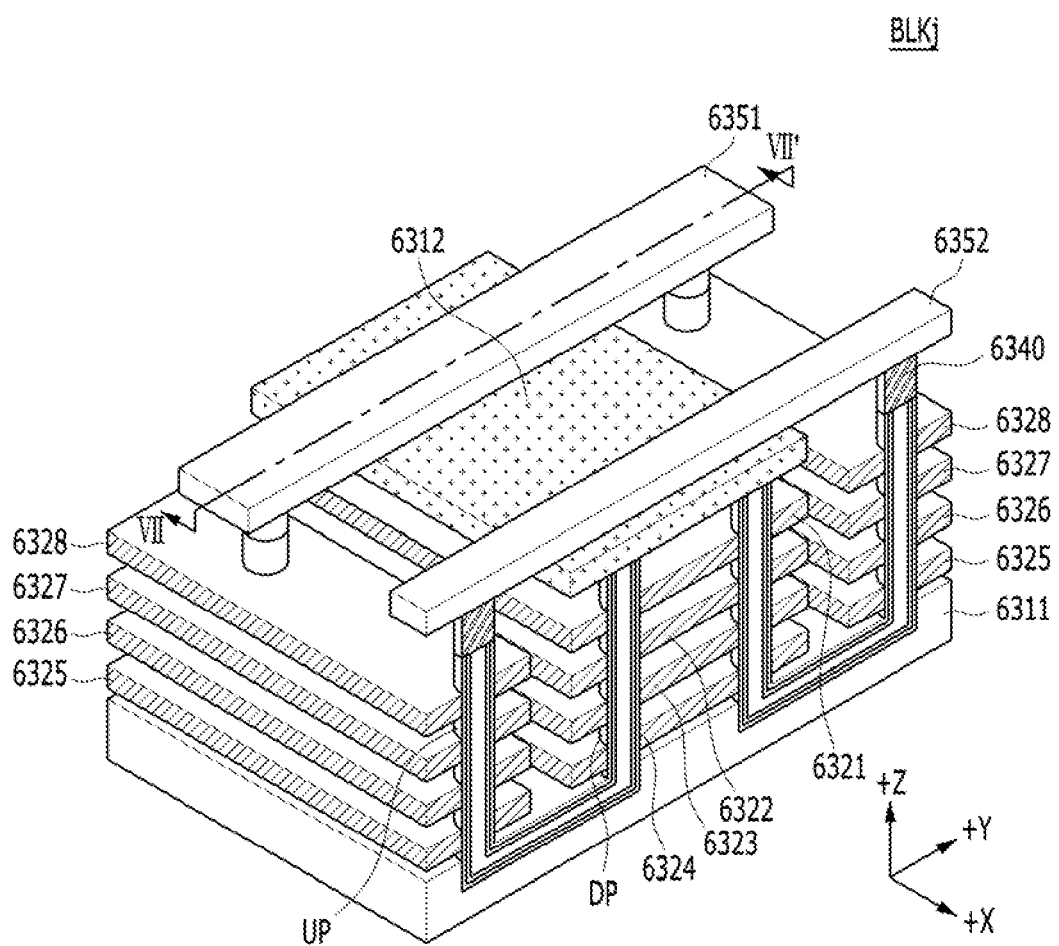
Figure 10:
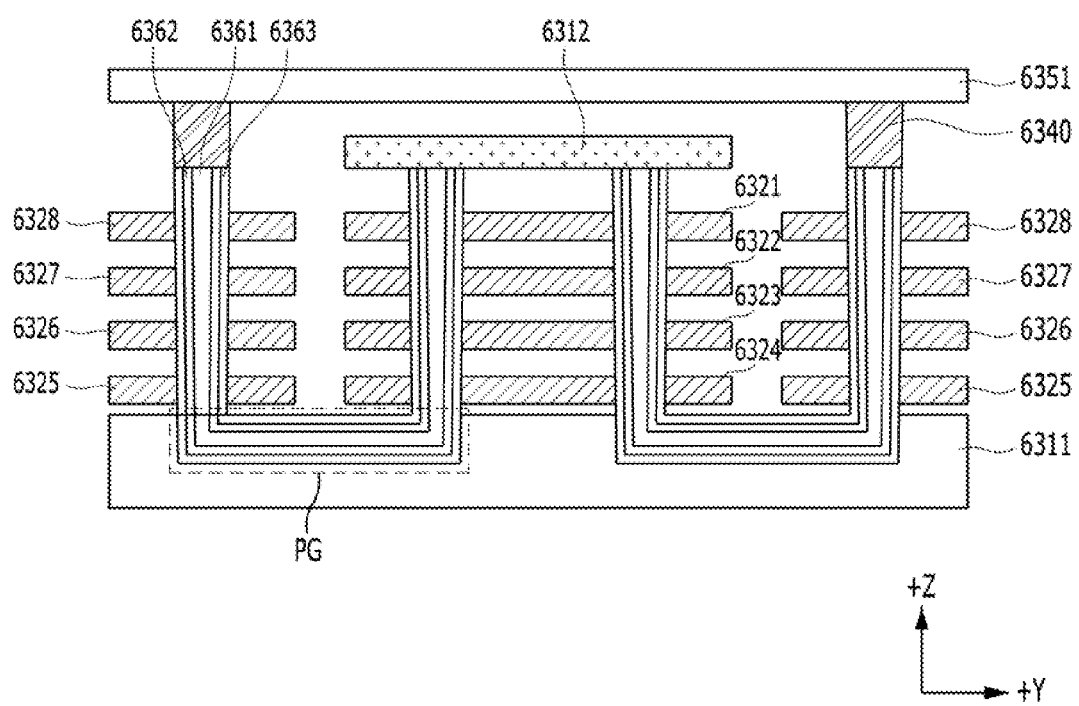
Figure 11:
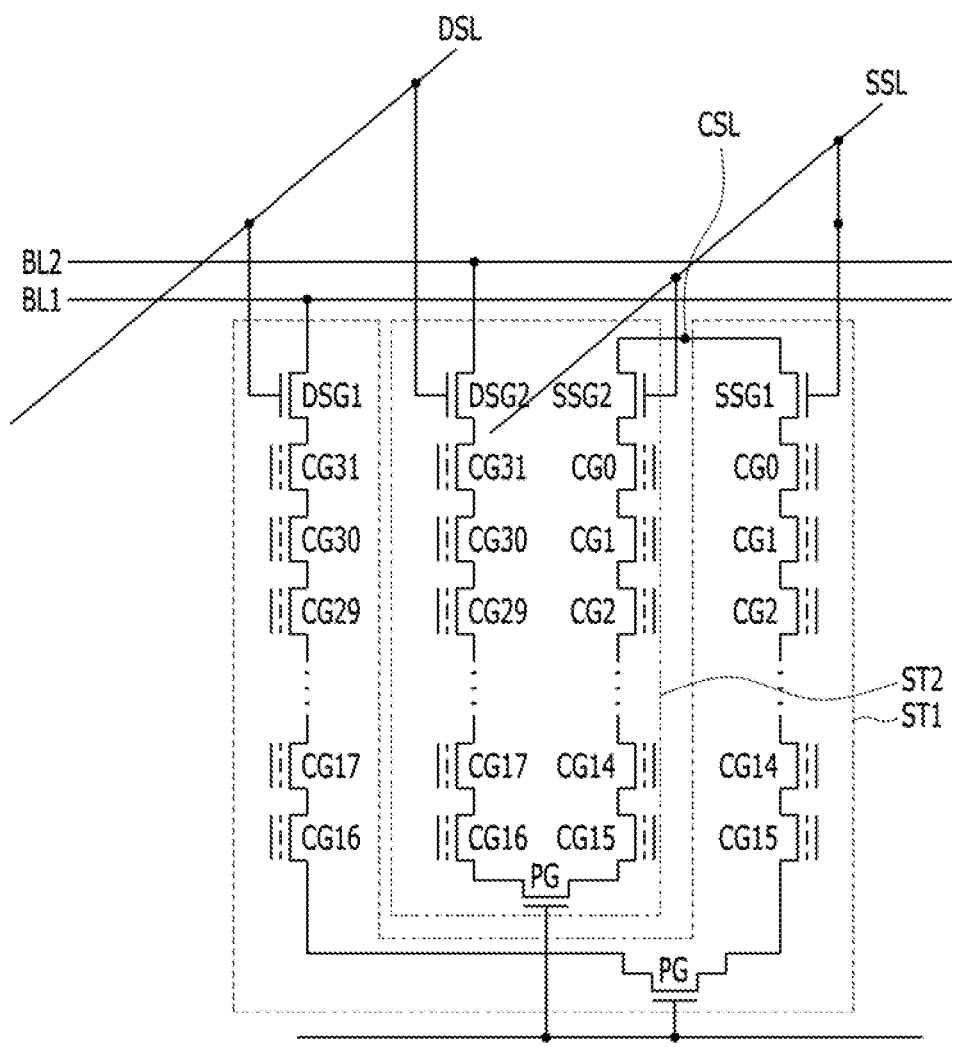

Referring now to FIGS. 9 to 11 an example of a three-dimensional (3D) nonvolatile memory device will be described. Specifically, FIG. 9 is a perspective view schematically illustrating only a single memory block BLKj of a three-dimensional (3D) nonvolatile memory device. It should be understood, however, that BLKj is only one of a plurality of memory blocks as shown in FIG. 4. FIG. 10 is a cross-sectional view illustrating the memory block BLKj taken along the line VII-VII' of FIG. 9.

Accordingly, the memory block BLKj may include structures which extend in the first to third directions X, Y and Z. A substrate 6311 may be provided. The substrate 6311 may include a silicon material doped with a first type impurity. For example, the substrate 6311 may include a silicon material doped with a p-type impurity or may be a p-type well, for example, a pocket p-well, and include an n-type well which surrounds the p-type well. While it is assumed in the embodiment shown, that the substrate 6311 is p-type silicon, it is to be noted that the substrate 6311 is not limited to being p-type silicon.

First to fourth conductive materials 6321 to 6324, which extend in the x-axis direction and the y-axis direction, are provided over the substrate 6311. The first to fourth conductive materials 6321 to 6324 may be separated by a predetermined distance in the z-axis direction.

Fifth to eighth conductive materials 6325 to 6328, which extend in the x-axis direction and the y-axis direction, may be provided over the substrate 6311. The fifth to eighth conductive materials 6325 to 6328 may be separated by a predetermined distance in the z-axis direction. The fifth to eighth conductive materials 6325 to 6328 may be separated from the first to fourth conductive materials 6321 to 6324 in the y-axis direction.

A plurality of lower pillars DP, which pass through the first to fourth conductive materials 6321 to 6324, may be provided. Each lower pillar DP extends in the z-axis direction. Also, a plurality of upper pillars UP which pass through the fifth to eighth conductive materials 6325 to 6328 may be provided. Each upper pillar UP extends in the z-axis direction.

Each of the lower pillars DP and the upper pillars UP may include an internal material 6361, an intermediate layer 6362, and a surface layer 6363. The intermediate layer 6362 may serve as a channel of the cell transistor. The surface layer 6363 may include a blocking dielectric layer, a charge storing layer and a tunneling dielectric layer.

The lower pillar DP and the upper pillar UP may be electrically coupled through a pipe gate PG. The pipe gate PG may be disposed in the substrate 6311. For instance, the pipe gate PG may include the same material as the lower pillar DP and the upper pillar UP.

A doping material 6312 of a second type, which extends in the x-axis direction and the y-axis direction, may be provided over the lower pillars DP. For example, the doping material 6312 of the second type may include an n-type silicon material. The doping material 6312 of the second type may serve as a common source line CSL.

Drains 6340 may be provided over the upper pillars UP. The drains 6340 may include an n-type silicon material. First and second upper conductive materials 6351 and 6352, which extend in the y-axis direction, may be provided over the drains 6340.

The first and second upper conductive materials 6351 and 6352 may be separated in the x-axis direction. The first and second upper conductive materials 6351 and 6352 may be formed of a metal. The first and second upper conductive materials 6351 and 6352 and the drains 6340 may be electrically coupled through contact plugs. The first and second upper conductive materials 6351 and 6352 respectively serve as first and second bit lines BL1 and BL2.

The first conductive material 6321 may serve as a source select line SSL, the second conductive material 6322 may serve as a first dummy word line DWL1, and the third and fourth conductive materials 6323 and 6324 serve as first and second main word lines MWL1 and MWL2, respectively. The fifth and sixth conductive materials 6325 and 6326 serve as third and fourth main word lines MWL3 and MWL4, respectively, the seventh conductive material 6327 may serve as a second dummy word line DWL2, and the eighth conductive material 6328 may serve as a drain select line DSL.

The lower pillar DP and the first to fourth conductive materials 6321 to 6324 adjacent to the lower pillar DP may form a lower string. The upper pillar UP and the fifth to eighth conductive materials 6325 to 6328 adjacent to the upper pillar UP may form an, upper string. The lower string and the upper string may be electrically coupled through the pipe gate PG. One end of the lower string may be electrically coupled to the doping material 6312 of the second type, which serves as the common source line CSL. One end of the upper string may be electrically coupled to a corresponding bit line through the drain 6340. One lower string and one upper string form one cell string which is electrically coupled between the doping material 6312 of the second type serving as the common source line CSL and a corresponding one of the upper conductive material layers 6351 and 6352 serving as the bit line BL.

That is, the lower string may include source select transistor SST, the first dummy memory cell DMC1, and the first and second main memory cells MMC1 and MMC2. The upper string may include the third and fourth main memory cells MMC3 and MMC4, the second dummy memory cell DMC2, and a drain select transistor DST.

In FIGS. 9 and 10, the upper string and the lower string may form a NAND string NS, and the NAND string NS may include a plurality of transistor structures TS. Since the transistor structure included in the NAND string NS in FIGS. 9 and 10 is described above in detail with reference to FIG. 7, a detailed description thereof will be omitted herein.

FIG. 11 is a circuit diagram illustrating the equivalent circuit of the memory block BLKj having the second structure as described above with reference to FIGS. 9 and 10. For convenience, only a first string and a second string, which form a pair in the memory block BLKj in the second structure, are shown.

Referring to FIG. 11, in the memory block BLKj having the second structure among the plurality of blocks of the memory device 150, cell strings, each of which is implemented with one upper string and one lower string electrically coupled through the pipe gate PG as described above with reference to FIGS. 9 and 10 may be provided in such a way as to define a plurality of pairs.

Namely, in the certain memory block BLKj having the second structure, memory cells CG0 to CG31 stacked along a first channel CH1 (not shown), for example at least one source select gate SSG1 and at least one drain select gate DSG1 may form a first string ST1, and memory cells CG0 to CG31 stacked along a second channel CH2 (not shown), for example, at least one source select gate SSG2 and at least one drain select gate DSG2 may form a second string ST2.

The first string ST1 and the second string ST2 may be electrically coupled to the same drain select line DSL and the same source select line SSL. The first string ST1 may be electrically coupled to a first bit line BL1, and the second string ST2 may be electrically coupled to a second bit line BL2.

While it is described in FIG. 11 that the first string ST1 and the second string ST2 are electrically coupled to the same drain select line DSL and the same source select line SSL, it may be envisaged that the first string ST1 and the second string ST2 may be electrically coupled to the same source select line SSL and the same bit line BL, the first string ST1 may be electrically coupled to a first drain select line DSL1 and the second string ST2 may be electrically coupled to a second drain select line DSL2. Further it may be envisaged that the first string ST1 and the second string ST2 may be electrically coupled to the same drain select line DSL and the same bit line BL, the first string ST1 may be electrically coupled to a first source select line SSL1 and the second string ST2 may be electrically coupled a second source select line SSL2.

Hereafter, an operation of processing data for the memory device 110 in the memory system 100 according to an embodiment of the present invention during the read operation will be described in detail with reference to FIGS. 12 to 14.

Figure 12:
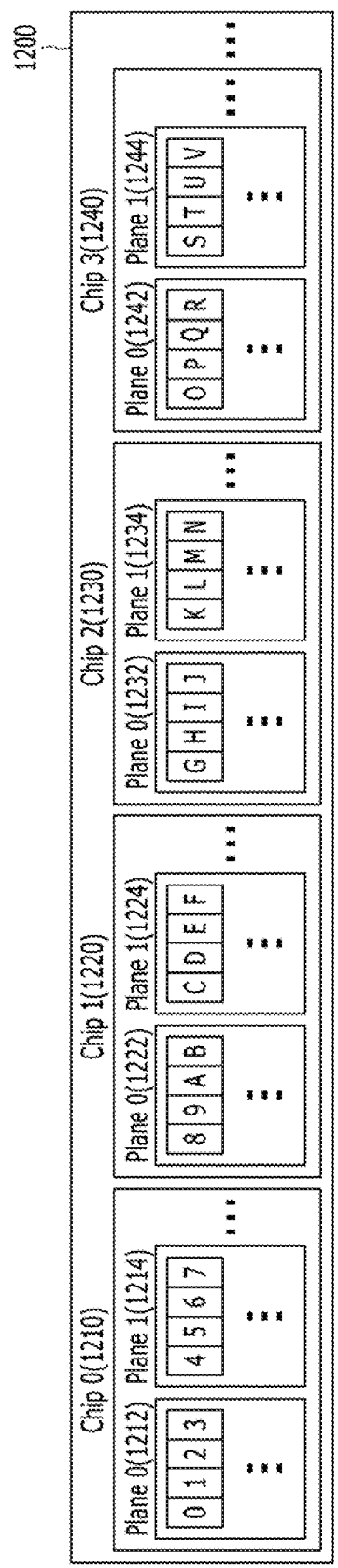
FIGS. 12 and 13 are diagrams illustrating a data processing operation of a memory system, according to an embodiment of the present invention
Figure 13:
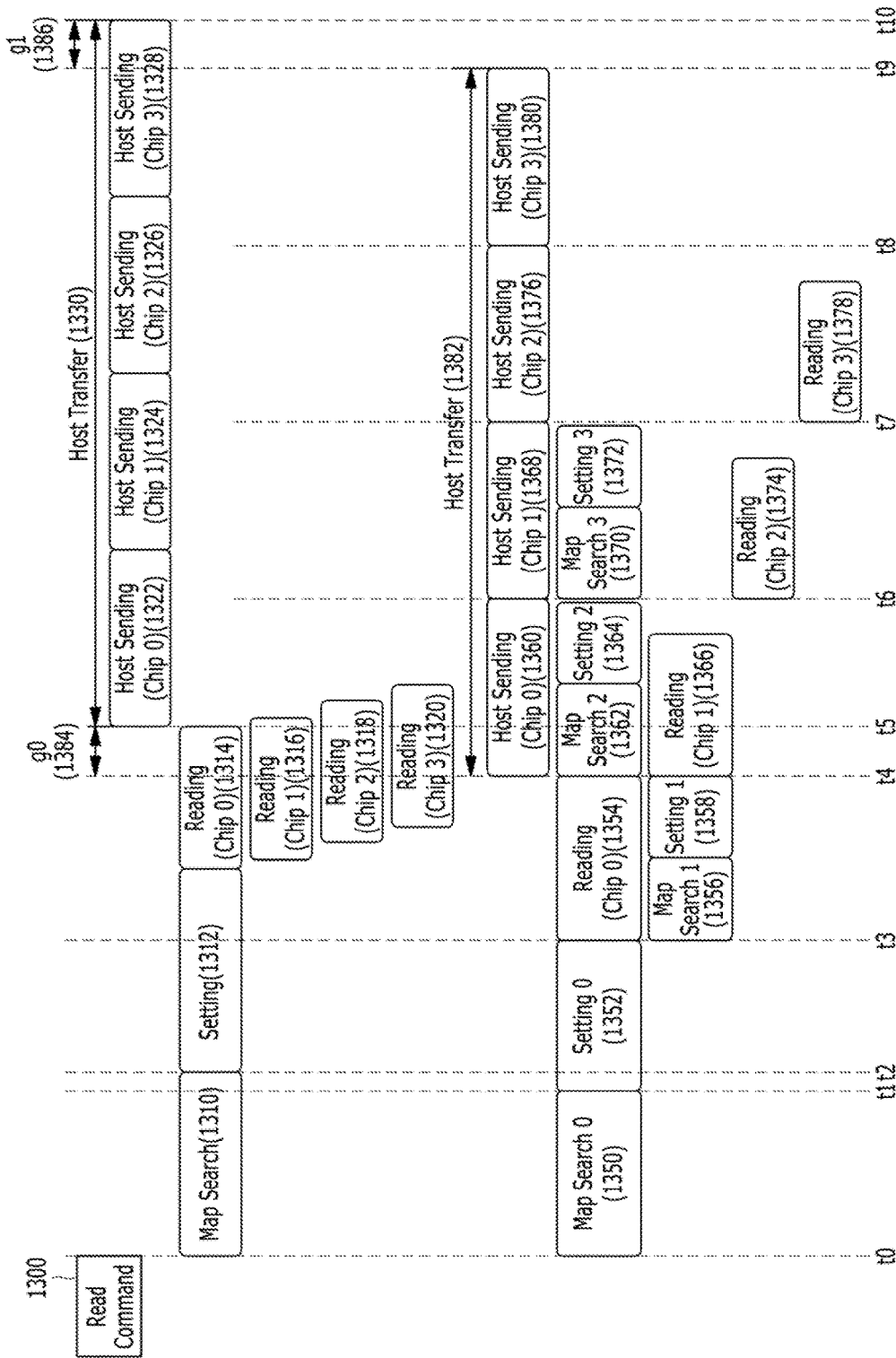

FIGS. 12 and 13 are diagrams for schematically describing an example of a data processing operation for a memory device 110 in a memory system 100.

Hereafter, a read operation to the memory blocks 152 to 156 in response to a read command is described, as an example of a data processing operation.

The data processing operation in the memory system 100 will be illustrated as performed by the controller 130 by way of example. However, it is noted that the data processing operation may also be performed by the processor 134 of the controller 130, for example, through the FTL as described above.

In response to a read command provided from the host 102, the controller 130 may search map data corresponding to the read command activate chips of the memory device 150 corresponding to the searched map data, read data from the activated chips and then provide the read data to the host 102.

The read operation may be broken down to 3 sequential stages: a search and setting stage, a read stage, and a transfer stage. During the search and setting stage, the controller 130 may search the map data on a segment by segment basis and activate the chip corresponding to the searched segment of the map data. During the read stage, the controller 130 may read data from the activated chip. During the transfer stage, the controller 130 may provide the read data to the host 102. The controller 130 may perform the search and setting stage according to a segment basis or may perform the 3 stages according to a pipelining basis.

According to the pipelining basis, the controller 130 may successively perform the search and setting stage for the segments of the map data, and may successively perform the read stage in order to consecutively perform the transfer stage according to the searched segments of the map data by the successive search and setting stages.

For example, the segments of the map data may be searched sequentially, for example, in the case of three segment, from the first to the third segment. In this case, during the transfer stage for the first searched segment the controller 130 may perform the read stage for the second searched segment; and during the read stage for the second searched segment, the controller 130 may perform the search and setting stage for the third searched segment. For example during a first transfer stage following a first search and setting stage and a first read stage for the first searched segment of the map data, the controller 130 may perform a second read stage following a second search and setting stage for the second searched segment; and during the second read stage for the second searched segment, the controller 130 may perform a third search and setting stage for the third searched segment. Hence according to the pipelining basis the number of operations that can be performed within a time interval is increased.

According to the segment basis, a segment may be selected over two (2) neighboring chips so that the controller 130 may perform a read operation to the chips in a sequential order.

Hereafter, an example will be described with the controller 130 receiving the read command 1300 from the host 102 for data 0 to 9 and data A to V stored in planes 0 (1212, 1222, 1232, and 1242) and 1 (1214, 1224, 1234, and 1244) of the respective chips 1210, 1220, 1230, and 1240 of the memory device 1200. In particular, the data 0, 1, 2, and 3 may be stored in the plane 0 (1212) of the chip 0 (1210); the data 4, 5, 6, and 7 may be stored in the plane 1 (1214) of the chip 0 (1210); the data 8, 9, A, and B may be stored in the plane 0 (1222) of the chip 1 (1220); the data C, D, E, and F may be stored in the plane 1 (1224) of the chip 1 (1220); the data G, H, I, J may be stored in the plane 0 (1232) of the chip 2 (1230); the data K, L, M, and N may be stored in the plane 1 (1234) of the chip 2 (1230); the data O, P, Q, and R may be stored in the plane 0 (1242) of the chip 3 (1240); and the data S, T, U, and V may be stored in the plane 1 (1224) of the chip 3 (1240).

In response to a read command for the data 1 to V, the controller 130 may divide the map data into a plurality of segments. The controller may then search map data on the basis of the divided segments. The controller 130 may perform the search and setting stage to each segment. The segments for the search and setting stage may be determined according to an operation time required for completing the read stage for each chip 1210, 1220, 1230, and 1240. The segment may be selected over neighboring 2 chips among the chips 1210, 1220, 1230, and 1240 so that the controller 130 may perform the read operation to the chips 1210, 1220, 1230, and 1240 in a sequential order.

According to the operation time for the read stage of the respective chips 1210, 1220, 1230, and 1240 {e.g., each operation time for the read stage to the data 0 to 7 stored in the chip 0 (1210); to the data 8 to F stored in the chip 1 (1220); to the data G to N stored in the chip 2 (1230); and to the data O to V stored in the chip 3 (1240)}, the controller 130 may divide the map data into a plurality of segments so that each segment covers two consecutive chips among the chips 1210, 1220, 1230, and 1240 for the read operation to the chips 1210, 1220, 1230, and 1240 in sequential order.

For example, the controller 130 may divide the map data into segments 0 to 3 so that the segment 0 includes the data 0 to 7 of the chip 0 (1210) and the data 8 of the chip 1 (1220); the segment 1 includes the data 9 to F of the chip 1 (1220) and the data G of the chip 2 (1230); the segment 2 includes the data H to N of the chip 2 (1230) and the data O of the chip 3 (1240); and the segment 3 includes the data P to V of the chip 3 (1240). In this example, the last segment 3 covers the single chip 3 (1240) due to the read command for the data 0 to V, which are covered by the segments 0 to 3. When requested data by the read command is greater than this example, the segment 3 may also cover another chip 4 (not shown) next to the chip 3 (1240).

For example, according to the operation times for the read stage of the respective chips 1210, 1220, 1230, and 1240, the controller 130 may sequentially perform the search and setting stages to the segments 0 to 3 at first to fourth sequential time points. The controller 130 may search the map data for the data 0 to 7 of the chip 0 (1210) and the data 8 of the chip 1 (1220) through the search and setting stage to the segment 0 at the first time point; search the map data for the data 9 to F of the chip 1 (1220) and the data G of the chip 2 (1230) through the search and setting stage to the segment 1 at the second time point; search the map data for the data H to N of the chip 2 (1230) and the data O of the chip 3 (1240) through the search and setting stage to the segment 2 at the third time point; and search the map data for the data P to V of the chip 3 (1240) through the search and setting stage to the segment 3 at the fourth time point.

According to the prior art as shown in the upper part of FIG. 13, a bundle of the search and setting stages are performed to the entire map data, then a bundle of the read stages are performed to the entire chips 1210, 1220, 1230, and 1240, and then a bundle of the transfer stages are performed to the entire read data. For example, when a read command 1300 is received from a host at a time point t0, a controller performs a bundle of map search operations 1310 to the entire map data for the data 0 to V corresponding to the read command 1300. Upon completion of the map search operations 1310 for all map data at a time point t2, the controller performs a bundle of setting (also referred to as trigger or activations operations 1312 to the entire chips 1210, 1220, 1230, and 1240 corresponding to the map data. When all of the chips 1210, 1220, 1230, and 1240 are activated, the controller sequentially performs a bundle of the read stages 1314, 1316, 1318, and 1320 for data stored in the respective chips 1210, 1220, 1230, and 1240. Through the bundle of the read stages 1314, 1316, 1318, and 1320, the controller sequentially performs the bundle of the transfer stages 1322, 1324, 1326, and 1328 to the entire read data. The last transfer stage 1328 to the data O to V read from the activated chip 3 (1240) may be completed at a time point t10. Hence, according to the prior art as shown in upper part of FIG. 13, there is an idle time for the next stage until the completion of the current stage due to the bundle data process.

According to an embodiment of the invention, as illustrated in the lower part of FIG. 13, however, when a read command 1300 is received from the host 102, the controller 130 may perform the map search and setting stages 1350 and 1352, 1356 and 1358, 1362 and 1364, and 1370 and 1372 on the pipelining basis or the segment basis.

For example, when receiving the read command 1300 from the host 102 at the time point t0 the controller 130 may perform the map search and setting stage 1350 and 1352 to segment 0 for the data 0 to 7 stored in the chip 0 (1210) and the data 8 stored in the chip 1 (1220) at time points t0 and t1. Upon completion of the search and setting stage 1350 and 1352 to segment 0 for the data 0 to 7 stored in the chip 0 (1210) and the data 8 stored in the chip 1 (1220) at a time point t3, the controller 130 may perform the read stage to the activated chip 0 (1210). Upon completion of the read stage to the activated chip 0 (1210) at a time point t4, the controller 130 may perform the transfer stage 1360 to the data 0 to 7 read from the activated chip 0 (1210).

During the read stage 1354 to the activated chip 0 (1210) starting at the time point t3, the controller 130 may perform the map search and setting stage 1356 and 1358 to segment 1 for the data 9 to F of the chip 1 (1220) and the data G of the chip 2 (1230). Upon completion of the map search and setting stage 1356 and 1358 to segment 1 for the data 9 to F of the chip 1 (1220) and the data G of the chip 2 (1230) at the time point 4, the controller 130 may perform the read stage 1366 to the activated chip 1 (1220). Upon completion of the read stage 1366 to the activated chip 1 (1220) and the transfer stage 1360 to the read data 0 to 7 from the activated chip 0 (1210) at a time point t6, the controller 130 may perform the transfer stage 1368 to the data 8 to F read from the activated chip 1 (1220).

Meanwhile, during the transfer stage 1360 to the data 0 to 7 read from the activated chip 0 (1210) and the read stage 1366 to the activated chip 1 (1220) starting at time point t4, the controller 130 may perform the map search and setting stage 1362 and 1364 to segment 2 for the data H to N of the chip 2 (1230) and the data O of the chip 3 (1240). Upon completion of the map search and setting stage 1362 and 1364 to segment 2 for the data H to N of the chip 2 (1230) and the data O of the chip 3 (1240) at the time point 6, the controller 130 may perform the read stage 1374 to the activated chip 2 (1230). Upon completion of the read stage 1374 to the activated chip 2 (1230) and the transfer stage 1368 to the data 8 to F read from the activated chip 1 (1220) at a time point t7, the controller 130 may perform the transfer stage 1376 to the data G to N read from the activated chip 2 (1230).

Further, during the transfer stage 1368 to the data 8 to F read from the activated chip 1 (1220) and the read stage 1374 to the activated chip 2 (1230) starting at time point t5, the controller 130 may perform the search and setting stage 1370 and 1372 to segment 3 for the data P to V of the chip 3 (1240). Upon completion of the search and setting stage 1370 and 1372 to segment 3 for the data P to V of the chip 3 (1240) at the time point 7, the controller 130 may perform the read stage 1378 to the activated chip 3 (1240). Upon completion of the read stage 1378 to the activated chip 3 (240) and the transfer stage 1376 to the data G to N read from the activated chip 2 (1230) at a time point t8, the controller 130 may perform the transfer stage 1380 to the data O to V read from the activated chip 3 (1240).

As described above, according to the prior art as shown in upper part of FIG. 13, the bundle of the search and setting stages 1310 and 1312 are performed to the entire map data during time points t0 to t1, then the bundle of the read stages 1314, 1316, 1318, and 1320 are performed to the entire chips 1210, 1220, 1230, and 1240, and then the bundle of the transfer stages 1322, 1324, 1326, and 1328 are performed to the entire read data during the data transfer period 1330 between the time points t5 and t10.

However, in the present embodiment of the pipelining basis, the controller 130 may sequentially perform the search and setting stages 1350 and 1352, 1356 and 1366, 1362 and 1364, and 1370 and 1372 on the segment basis such that each segment covers neighboring 2 chips among the chips 1210, 1220, 1230, and 1240; then sequentially perform the read stages 1354, 1366, 1374, and 1378 for the respective chips 1210, 1220, 1230, and 1240 according to sequential results of the search and setting stages 1350 and 1352, 1356 and 1366, 1362 and 1364, and 1370 and 1372; and then sequentially perform the transfer stages 1360, 1368, 1376, and 1380 according to sequential results of the read stages 1354, 1366, 1374, and 1378 during the data transfer period 1382.

Compared to the prior art, in the present embodiment, the first transfer stage 1360 to the data 0 to 7 read from the activated chip 0 (1210) may start at the time point t4 prior to the first transfer stage 1322, starting at time point t5, by an amount of time g0 (1384). Also the last transfer stage 1380 to the data O to V read from the activated chip 3 (1240) may be completed at a time point t9 prior to the last transfer stage 1328, starting at time point t10 by an amount of time g1 (1386). The amounts of time g0 (1384) and g1 (1386) may be the same when the operation times for the transfer stage according to the prior art and the present invention are the same.

Thus, compared to the prior art, the memory system according to the present embodiment can acquire an operation time gain g0 (1380) or g1 (1386) for the transfer stage. Hence, the controller 130 may process data more rapidly by the amount of time g0 (1380) or g1 (1386).

Figure 14:
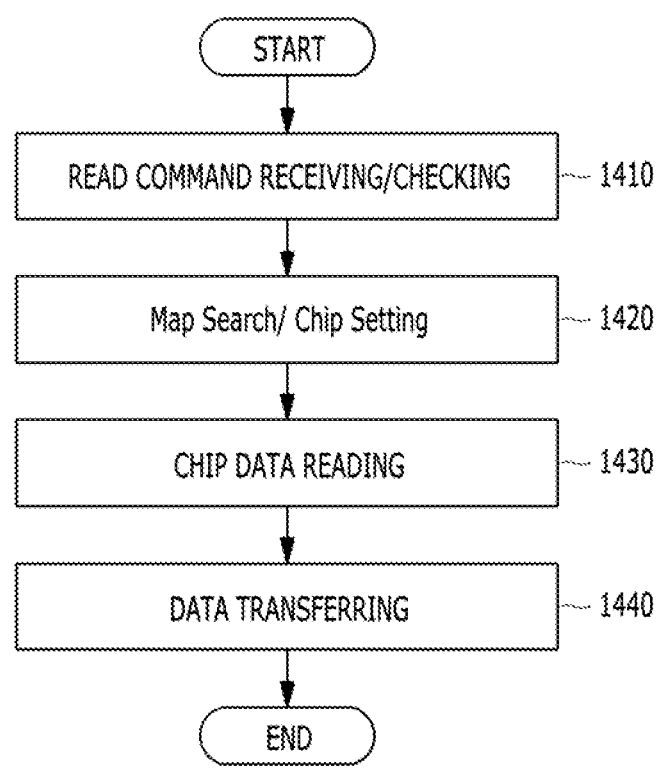
FIG. 14 is a flowchart schematically illustrating the data processing of the memory system, according to an embodiment of the present invention.

Referring to the flowchart of FIG. 14 a data processing operation of the memory system 100 may include receiving a read command from a host 102, and checking the read command or checking size of read data corresponding to the read command, at step 1410.

At step 1420, the memory system 100 may perform a map search and setting stage on a segment basis as described above with reference to FIGS. 12 and 13 lower part.

At step 1430, the memory system 100 may perform a read stage to the activated chips.

At step 1440, the memory system may perform the transfer stage to the data read from the activated chips to the host 102.

The search and setting stage, the read stage, and the transfer stage of steps 1420, 1430 and 1440 have already been described in detail with reference to FIGS. 12 and 13 lower part. Thus, the detailed descriptions thereof are omitted herein.

According to the embodiments of the present invention, the memory system and the operating method thereof has reduced complexity and improved performance making processing data to and from a memory device faster and more efficient.

Although various embodiments have been described for illustrative purposes it will be apparent to those skilled in the art after having read the present disclosure that various changes and modifications may be made to the described embodiments without departing from the spirit and scope of the invention as defined in the following claims.

What is claimed is:

1. A memory system comprising:
one or more memory chips suitable for storing data; and
a controller suitable for performing a search and setting stage, a read stage and a transfer stage during a read operation of the memory system,
wherein performing the search and setting stage comprise searching one or more segments of a map data corresponding to a read command on a segment by segment and activating one or more memory chips corresponding to the searched one or more segments;
wherein performing the read stage comprises reading data stored in the activated memory chips;
wherein performing the transfer stage comprises transferring the data read to a host; and
wherein the controller performs the search and setting stage one segment at a time, the read stage one chip at a time, and the transfer stage one chip at a time on a pipelining basis.

2. The memory system of claim 1, wherein each of the one or more segments comprises a part of the map data for two neighboring memory chips.

3. The memory system of claim 2, wherein a first segment comprises the entire map data for a first memory chips and at least a part of the map data for a second memory chip.

4. The memory system of claim 3, wherein the controller performs the search and setting stage to the first segment, then performs the read stage to the first memory chip, and then performs the transfer stage to the data read from the first memory chip.

5. The memory system of claim 4, wherein a second segment comprises the rest of the map data for the second memory chip and a part of the map data for a third memory chip.

6. The memory system of claim 5, wherein during the read stage to the first memory chip, the controller performs the search and setting stage to the second segment.

7. The memory system of claim 6, wherein a third segment comprises the rest of the map data for the third memory chip.

8. The memory system of claim 7, wherein during the transfer stage to the data read from the first memory chip, the controller performs the read stage to the second memory chip and the search and setting stage to the third segment.

9. The memory system of claim 8,
wherein during the transfer stage to the data read from the second memory chip, the controller performs the read stage to the third memory chip, and
wherein upon completion of the read stage to the third memory chip, the controller performs the transfer stage to the data read from the third memory chip.

10. The memory system of claim 2,
wherein the segments are determined according to operation times of the read stages to the memory chips; and
wherein the controller performs the search and setting stage, the read stage and the transfer stage on a pipelining basis for a read operation to the memory chip in sequential order.

11. An operating method of a memory system, the method comprising one or more memory chips suitable for storing data, the method comprising:
performing a search and setting stage of searching one or more segments of a map data corresponding to a read command on a segment by segment and activating one or more of the memory chips corresponding to the searched segments during a read operation of the memory system;
performing a read stage of reading data stored in the activated memory chips; and
performing a transfer stage of transferring the data read from the activated chips to a host;
wherein the search and setting stage is performed in one segment at a time, the read stage is performed one chip at a time, and the transfer stage is performed one chip at a time; and
wherein the search and setting stage, the read stage, and the transfer stage are performed on a pipelining basis.

12. The operating method of claim 11, wherein each of the segments includes at least a part of the map data for two neighboring memory chips.

13. The operating method of claim 12, wherein a first segment includes the entire map data for a first memory chip and a part of the map data for a second memory chip.

14. The operating method of claim 13, wherein the search and setting stage is performed to the first segment, then the read stage is performed to the first memory chip, and then the transfer stage is performed to the data read from the first memory chip.

15. The operating method of claim 14, wherein a second segment comprises the rest of the map data for the second memory chip and a part of the map data for a third memory chip.

16. The memory system of claim 15, wherein during the read stage to the first memory chip, the search and setting stage is performed to the second segment.

17. The operating method of claim 16, wherein a third segments comprises the rest of the map data for the third memory chip.

18. The operating method of claim 17, wherein during the transfer stage to the data read from the first memory chip, the read stage is performed to the second memory chip and the search and setting stage is performed to the third segment.

19. The operating method of claim 18,
wherein during the transfer stage to the data read from the second memory chip, the read stage is performed to the third memory chip, and
wherein upon completion of the read stage to the third memory chip, the transfer stage is performed to the data read from the third memory chip.

20. The operating method of claim 12,
wherein the segments are determined according to operation times of the read stages to the memory chips, and
wherein the search and setting stage, the read stage and the transfer stage are performed on the pipelining basis for a read operation to the memory chip in sequential order.

* * * * *